United States Patent
Bruckner

(10) Patent No.: US 10,630,604 B2
(45) Date of Patent: Apr. 21, 2020

(54) METHOD FOR ISOCHRONOUS DATA COMMUNICATION IN A REALTIME ETHERNET DATA NETWORK

(71) Applicant: B&R INDUSTRIAL AUTOMATION GMBH, Eggelsberg (AT)

(72) Inventor: Dietmar Bruckner, Anthering (AT)

(73) Assignee: B&R INDUSTRIAL AUTOMATION GMBH, Eggelsberg (AT)

(*) Notice: Subject to any disclaimer, the term of this patent is extended or adjusted under 35 U.S.C. 154(b) by 88 days.

(21) Appl. No.: 15/281,643

(22) Filed: Sep. 30, 2016

(65) Prior Publication Data

US 2017/0099234 A1    Apr. 6, 2017

(30) Foreign Application Priority Data

Oct. 1, 2015 (AT) .............................. A 50830/2015

(51) Int. Cl.
*G06F 15/173* (2006.01)
*H04L 12/911* (2013.01)
(Continued)

(52) U.S. Cl.
CPC .......... *H04L 47/82* (2013.01); *H04L 12/4035* (2013.01); *H04L 12/40156* (2013.01); *H04L 41/12* (2013.01); *H04L 2012/4026* (2013.01)

(58) Field of Classification Search
None
See application file for complete search history.

(56) References Cited

U.S. PATENT DOCUMENTS 6,374,314 B1 * 4/2002 Darnell ................... H04L 29/06
                                                    710/29
6,480,968 B1 * 11/2002 Tsuzuki ............ H04L 12/40058
                                                    375/E7.025
(Continued)

FOREIGN PATENT DOCUMENTS

DE    102005060085    4/2008
GB       2 419 070    4/2006
WO      03/028289     4/2003

OTHER PUBLICATIONS

EP Search Report issued in Application No. 16 19 1496 (6 pages).
(Continued)

*Primary Examiner* — Dhairya A Patel
(74) *Attorney, Agent, or Firm* — Greenblum & Bernstein, P.L.C.

(57) ABSTRACT

In order to be able to better and more flexibly utilize the available isochronous bandwidth of a realtime capable Ethernet network protocol, it is provided that a number (k) of transmission cycles (Z1, ..., Zk) are combined to create a slow transmission cycle (ZL) and two network nodes (M, S1, ..., Sn) communicate with one another in this slow transmission cycle (ZL) in that data communication of these two network nodes (M, S1, ..., Sn) is provided in each kth transmission cycle (Z), and/or a transmission cycle (Z) is divided into a plurality (j) of rapid transmission cycles (ZS) and two network nodes (M, S1, ..., Sn) communicate with one another in this rapid transmission cycle (ZS) in that data communication of these two network nodes (M, S1, ..., Sn) is provided j times in each transmission cycle (ZS).

3 Claims, 5 Drawing Sheets

(51) Int. Cl.
  *H04L 12/403* (2006.01)
  *H04L 12/40* (2006.01)
  *H04L 12/24* (2006.01)

(56) References Cited

U.S. PATENT DOCUMENTS

| | | | | |
|---|---|---|---|---|
| 8,051,197 | B2* | 11/2011 | Mullendore | H04L 47/10 |
| | | | | 709/234 |
| 8,972,521 | B2* | 3/2015 | Fritsche | H04L 12/42 |
| | | | | 709/217 |
| 2004/0114582 | A1* | 6/2004 | Gotz | H04L 12/40006 |
| | | | | 370/360 |
| 2004/0258015 | A1* | 12/2004 | Bruckner | H04L 12/6418 |
| | | | | 370/329 |
| 2004/0261101 | A1 | 12/2004 | Iwamura | |
| 2005/0041653 | A1* | 2/2005 | Arnold | H04L 45/00 |
| | | | | 370/383 |
| 2005/0041690 | A1* | 2/2005 | Arnold | H04L 12/6418 |
| | | | | 370/493 |
| 2006/0251046 | A1* | 11/2006 | Fujiwara | H04J 3/0652 |
| | | | | 370/350 |
| 2007/0230462 | A1* | 10/2007 | Nakayama | H04L 12/403 |
| | | | | 370/389 |
| 2009/0129395 | A1* | 5/2009 | Janssen | H04L 12/403 |
| | | | | 370/400 |
| 2013/0111088 | A1* | 5/2013 | Cho | G06F 13/00 |
| | | | | 710/110 |
| 2016/0034417 | A1* | 2/2016 | Chavez | G06F 13/4295 |
| | | | | 710/110 |
| 2016/0360526 | A1* | 12/2016 | Lehmann | H04L 65/4076 |

OTHER PUBLICATIONS

Article entitled FIT-Ethernet: A Flexible Real-Time Communication Protocol . . . by Almeida L et al., Aug. 2005.
Austrian Search Report dated Jul. 18, 2016 and issued in Application No. A 50830/2015.
Article entitled Ubiquitous Homelinks Based on IEEE 1394 and Ultra Wideband Solutions by M. Nakagawa et al, Apr. 2003.
Article entitled the Many Faces of Industrial Ethernet by J-D Decotignie, Mar. 2009.
EP Office Action issued in Application No. 16 19 1496 (4 pages).

* cited by examiner

METHOD FOR ISOCHRONOUS DATA COMMUNICATION IN A REALTIME ETHERNET DATA NETWORK

This application claims priority under 35 U.S.C, § 119(a) of Austrian Application No. A50830/2015 filed Oct. 1, 2015, the disclosure of which is expressly incorporated by reference herein in its entirety The present invention relates to a method for isochronous data communication in a realtime-capable Ethernet data network in which network nodes are connected to one another via a switched Ethernet data network and a transmission cycle, having a prespecified cycle time, is provided for Ethernet data communication between the network nodes.

In a data network for data communication, a network protocol is implemented, with which data is transferred in data packets in the data network between the network nodes which are connected to the data network. Probably the best known and most widespread network protocol is the Ethernet protocol. Hereto, Ethernet defines data packets (also called data frame or Ethernet frame), in which data of a higher-level communication protocol can be transferred encapsulated in an Ethernet data packet. In doing so, data of the communication protocol can be transferred in an Ethernet data packet with a data length between 46 and 1500 bytes. Addressing in the Ethernet protocol is effected by means of MAC (Media Access Control) addresses of the network nodes which are clearly allocated for every network device. As seen from the perspective of the known OSI model, Ethernet is exclusively implemented on layers 1 and 2. In the higher layers, different communication protocols can be implemented. Hereby, a multiplicity of communication protocols has been established, for example IP in layer 3 or TCP and LOP in layer 4 to name but a few of the most widespread communication protocols.

With regard to hardware, today's Ethernet systems are so-called switched data networks, in which individual network nodes do not have to be connected with one another and do not have to be able to communicate with one another, but can instead be connected by means of coupling elements, so called switches or network hubs. For such purpose, a coupling element has a number of network ports for the option of connecting a network participant (either a network node or a different coupling element). Such a coupling element forwards an Ethernet data packet either to all ports (hub) or to (one) specific port(s) (switch), Thus, so-called point-to-point connections are created in a switched data network, in which Ethernet data packets are forwarded from one network node to a different network node by means of a number of coupling elements (hub, switch).

Network nodes which are used in the industrial automation often have a built-in internal 3-port switch, wherein two ports are accessible from outside and the third port serves the internal interconnection. As a result, without additional external coupling elements, line topologies can be realized, in which a network node is connected to the next adjacent network node in the form of a line, which is advantageous in an industrial environment for reducing the cabling effort. However, it is self-evident that external network switches or external network hubs can also be used for the setup of the network topology, Basically, any network topology is possible, i.e. particularly a star topology, a line topology, a tree topology, a ring topology, etc. as well as any combination thereof. As a rule, a ring topology, as is known in general, requires specific precautions in order to prevent the uncontrolled circulation of multiple-address data packets.

In order to be able to also use Ethernet for industrial automation, real-time capable Ethernet network protocols have already been developed because the standard Ethernet network protocol is known to not be real-time capable. Examples of known real-time capable Ethernet network protocols are Modbus/TCP, Ethernet/IP, ProfiNET IRT, EtherCAT, or Ethernet POWERLINK, to name but a few. In this context, often also the term industrial Ethernet is used. These real-time capable Ethernet network protocols are supposed to ensure data communication that is sufficiently fast and deterministic for the corresponding application. They are thus supposed to ensure that a real-time relevant data packet is transferred via the network within a predetermined interval from a transmitting network node to a receiving network node. In an industrial automation environment, real-time capability means, e.g. that a fixed interval must be observed between the acquisition of a measured value, transfer of the measured value to a control unit, calculation of an actuating value in the control unit based on the measured value, and transfer of the actuating value to an actuator for executing an operation. With reference to the real-time capable Ethernet data network for transferring these data, a predetermined interval must be ensured.

In an industrial automation environment, there is general y as least one master network node (hereinafter also called master for short) which communicates with at least one associated, but usually a plurality of associated slave network nodes (hereinafter also caned slaves for short). For realizing a real-time capable Ethernet data network, the known real-time capable Ethernet network protocols have defined a transmission cycle having a predefined cycle time, within which the master can usually communicate with each slave. This normally comprises cyclically the possibility of a data packet from the master to every slave and conversely also at least one data packet from a slave, normally at least one data packet from each slave to the associated master. The attainable and beforehand ascertainable minimal cycle time results from the sum of the run times of the data packets. The run times are hardware-dependent and result from bit transmission times (length, payload) of the data packets, network infrastructure (e.g. delays due to coupling elements), and the network topology. The above-mentioned limits regarding the size of the Ethernet data packets must also be taken into account.

This cyclical data traffic (also called isochronous data traffic), which is the basis of the real-time capability in the real-time capable Ethernet network protocol, is, as a rule, expanded in every transmission cycle through asynchronous (non-cyclical) data packets. Such asynchronous data packets are used by the data communication, which is not subject to the real-time requirements, for example, for the configuration of the slaves, for visualization purposes or for status queries. For such asynchronous data packets, bandwidth is reserved, i.e., a specific, defined time for asynchronous data traffic is available in every transmission cycle. However, the network nodes must share this asynchronous section of a transmission cycle, which is why there are different approaches in the known realtime-capable Ethernet protocols.

The known realtime-capable Ethernet protocols are distinguished from one another in particular in the specific implementation of this cyclic isochronous and asynchronous data traffic. The known realtime-capable Ethernet protocols are also distinguished from one another in the hardware used.

For instance, with POWERLINK, ProfiNET and Ethernet/IP, the isochronous data communication within a transmission cycle is fixedly planned and divided in advance. That is, each network node may only send data packets at a prespecified time within the transmission cycle. This way data collisions may be prevented and no data buffers are necessary in the network nodes for the isochronous data traffic.

The realtime capability of the Ethernet protocol is assured using this fixed prespecification of the cycle time of a transmission cycle and using the fixed division of a transmission cycle into isochronous and asynchronous data traffic. The size (in the sense of the number of the built in network nodes) of realtime-capable Ethernet data networks continues to grow, however. Therefore, the data communication challenges for realtime-capable Ethernet data networks also get increasingly diverse, as well. For instance, the central current control form servomotor requires very rapid cycle times in the range of <500 μs, Conventional sensors typically detect and transmit measurement values much more slowly, so that for sensors slower cycle times in the range of 10 ms may be sufficient. However, the transmission cycle or cycle time must be uniformly established for the entire data network and for all network nodes. The transmission cycle of an Ethernet network protocol today is consequently determined by the network nodes with the greatest demands for cycle time.

But this also means that in addition bandwidth must be planned into each transmission cycle for network nodes with lower demands for cycle time, since these network nodes send data packets from time to time, as well. Thereby much bandwidth is blocked by such network nodes, which reduces the achievable data rates of the entire realtime-capable Ethernet data network. It may be that such a network node transmits the same data in a plurality of successive transmission cycles, because the data are not updated rapidly enough, but the implemented Ethernet network protocol forces the sending of data. To reduce this problem, in the POWERLINK Ethernet network protocol the possibility has already been created for a plurality of network nodes to share different transmit slots for isochronous data packets. Thus slower network nodes may transmit isochronous data packets at a multiple of the required fast cycle time, so that the available isochronous bandwidth may be better utilized. In this mode of operation, POWERLINK permits exactly one multiplication factor between the rapid and the slow cycle. But this means that the network nodes that share a slow transmit slot must fit one another according to their requirements and must also fit according to their number so that the cycle time can be optimal overall. If, for instance, two network nodes share a transmit slot, it can only be two network nodes that each get by with two-times the cycle time (since each network node can only transmit in every other transmission cycle), Planning such an Ethernet network protocol is therefore relatively complicated, especially in large data networks. In addition, the current solution offers little flexibility, so that options are limited, especially in large data networks with many network nodes.

It is therefore an object of the present invention to provide a method with which the available isochronous bandwidth of a realtime-capable Ethernet network protocol may be better and more flexibly used.

This object is inventively attained in that a number k of transmission cycles are combined to create a slow transmission cycle and two network nodes communicate with one another in this slow transmission cycle in that data communication of these two network nodes is provided in each $k^{th}$ transmission cycle, and/or a transmission cycle is divided into a plurality j of rapid transmission cycles and two network nodes communicate with one another in this rapid transmission cycle in that data communication of these two network nodes is provided j times in each transmission cycle. This permits different time planes for data communication to be introduced into the data network. In addition to normal data communication in the transmission cycle with the predetermined cycle time, slower and/or more rapid data communication may be realized between certain network nodes. Thus data communication in the data network may be configured to be very flexible and the available bandwidth may be better utilized.

It is particularly advantageous when a first rapid transmission cycle is implemented between a first network node and a second network node and a second rapid transmission cycle is implemented between the second network node and a third network node, wherein the first rapid transmission cycle and the second rapid transmission cycle are temporally offset to one another so that the second network node receives a first data packet from the first network node and simultaneously transmits a second data packet to the third network node. In this way these network nodes may rapidly exchange data with one another while using less bandwidth in the data communication.

The present invention is described in greater detail in the following, referencing FIGS. 1 through 5, which depict advantageous embodiments of the invention schematically and without being limiting.

Figure 1:
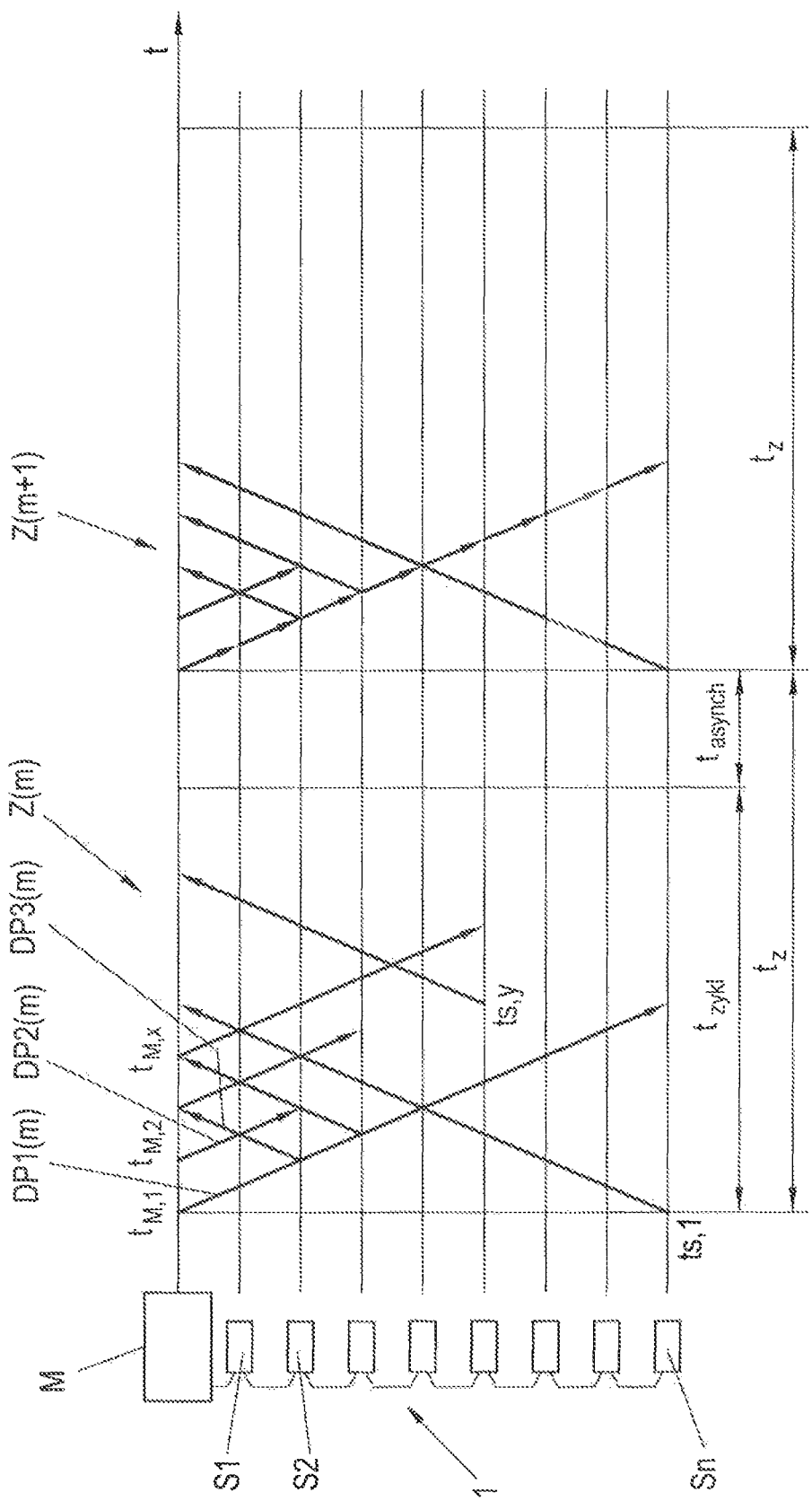
FIGS. 1 and 2 depict communication on a realtime-capable Ethernet data network according to the prior art.

The realtime-capable Ethernet network protocol underlying the invention is explained using FIG. 1. An exemplary network topology in the form of a linear topology is used in which a master M is connected to a series of linearly connected slaves S1 . . . Sn to form an Ethernet data network 1. The slaves S1 . . . Sn here are embodied as network devices having an integrated 3-port switch (coupling element) that permits such a linear topology without external coupling elements. The master M is able to communicate in every transmission cycle Z, at prespecified cycle time $t_z$, with every slave S1 . . . Sn, in that Ethernet data packets DP (here-inafter simply called data packets DP) are sent on the Ethernet data network 1. A sent data packet DP is indicated as an arrow in FIG. 1, wherein the arrow tip indicates the transmit direction (that is, from master M to a slave S or vice versa). Each horizontal line is assigned to a network node (master M or Slave S1 . . . Sn) and represents a timeline. The latency caused by the network when transmitting the data packets DP via the Ethernet data network 1 is indicated by the inclined arrows, wherein the processing period for the data packs DP into the coupling elements and the latency from the finite propagation speed in the medium (copper cable, fiber optics), combined and simplified, are assumed as constant.

In the Ethernet network protocol a transmission cycle Z is precisely temporally divided in that the times $t_{M,1}$, $t_{M,2}, \ldots, t_{M,x}, t_{S,1}, \ldots, t_{S,y}$ at which the master M or the slaves S1 . . . Sn may send data packets DP are predefined. In this way it is possible to prevent data collisions on the Ethernet data network 1 (or delays due to accumulating switch queues). However, since Ethernet allows for a full-duplex data communication, it is possible that in a network section, data packets DP are transmitted simultaneously in both directions. This is how each of the subscribing network nodes (master M, slaves S) know the time within a transmission cycle Z at which they may send data packets DP, and when they are to receive some.

These times $t_M$, $t_S$ within the transmission cycle Z may be planned very precisely in advance if it is known how much data (bytes) are transmitted in a data packet DP. The larger the data packet DP to be expected, the further apart the times $t_M$, $t_S$. If the data size is not known in advance, a maximum data size may be assumed, e.g. the maximum frame size for an Ethernet frame. Between two data packets DP also a predetermined pause must be maintained.

The number of network nodes, masters (M) and slaves (S1 . . . Sn), and the size of the sent data are therefore co-determinant for the attainable cycle time $t_Z$.

In FIG. 1, the master M transmits a data packet DP1(m) to the last slave Sn in the transmission cycle Z(m). However, this data packet DP1(m) could also be a summation frame that contains data for all slaves S1 . . . Sn (indicated in the transmission cycle Z(m+1)) and from which the slaves S1 . . . Sn read their data. At an established time $t_{M,2}$ thereafter, the master M transmits the next data packet DP2(m), in this case, e.g. to the slave S2. The slave S2 may also transmit a data packet DP3(m) to the master M at the same time. This principle is also maintained by the rest of the network nodes, wherein it is not necessary for every slave S1 . . . Sn to receive or transmit a data packet DP. However, the data communication on the Ethernet data network 1 is advantageously planned by the prespecification of the times $t_M$, $t_S$ such that the data packets DP from the slaves S1 . . . Sn arrive at the master M successively and without a temporal gap (apart a pause that is to be maintained). This communication sequence then repeats itself in the subsequent transmission cycles Z(m+k).

This planned data communication occurs cyclically and in each transmission cycle Z a temporal segment $t_{zykl}$ is provided for this isochronous data traffic, through which the realtime-capability is implemented. However, in each transmission cycle Z also a segment $t_{asynch}$ is reserved for asynchronous data traffic in which Ethernet data communication takes place which does not have to satisfy hard realtime requirements. If the cyclical communication differs from cycle to cycle (as is indicated in FIG. 1 between Z(m) und Z(m+1), as an example), then there is at least a maximum periodic time (k transmission cycles Z, hereinafter called the slow transmission cycle), within which the isochronous transmit patterns (not necessarily the data contents) repeat precisely, i.e. the cyclic data packets in Z(m) are identical to those in Z(m+k). In each individual transmission cycle Z, however, the ratio between $t_{zykl}$ and $t_{asynch}$ may change, depending on the number of planned cyclic data packets DP.

Figure 2:
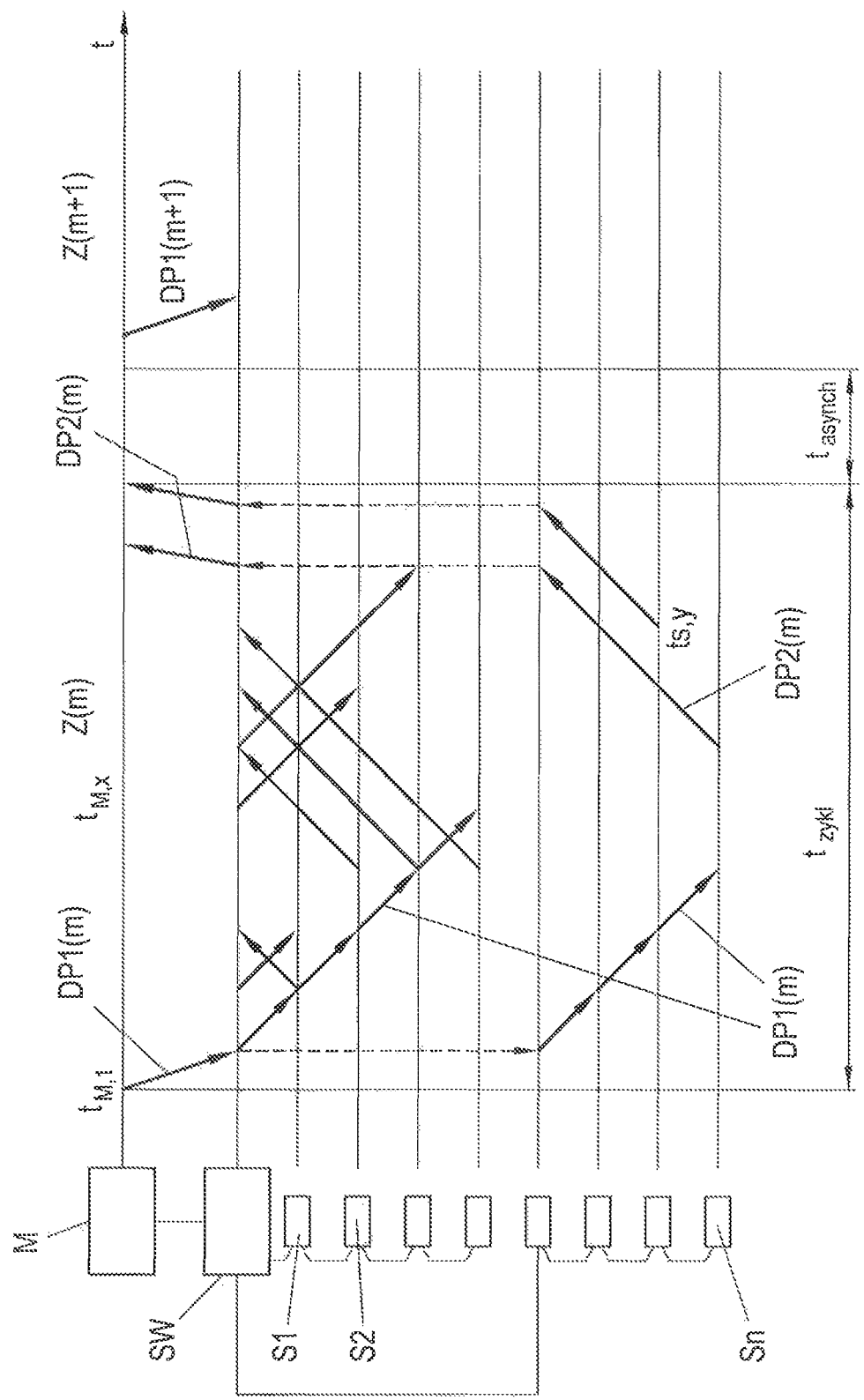

This communication principle of course also applies in other network topologies, as is de-scribed in FIG. 2 with the example of a tree topology. In this case, a star topology is constructed by means of an external network switch SW, wherein a line topology as described in FIG. 1 is realized in each branch. The master M is also connected to the network switch SW. In the example shown, a data packet DP1(m) is transmitted, in the form a summation frame, to all slaves S1 . . . Sn at time $t_M$ at the beginning of each transmission cycle Z. This data packet DP1(m) is forwarded by the network switch SW to the two branches and there is transmitted to all slaves S1 . . . Sn. The other data packets DP are then retransmitted at times $t_{M,x}$, $t_{S,y}$ provided therefor within the transmission cycle Z(m). However, it must be kept in mind that the data packets DP that are returned to the master M by the slaves S1 . . . Sn should preferably be planned such that no data jam can occur in the master M and in the network switch SW therebetween. The time for the data packet DP2(m) from the slave Sn to the master M should be planned, e.g. such that this data packet DP2(m) does not collide with other data packets from the other branch of the tree topology, as shown in FIG. 2. For reasons of clarity, data packets DP moving back and forth between master M and network switch SW are depicted only partly in FIG. 2.

The inventive method for isochronous data communication is explained in the following using FIGS. 3 and 4. Without limiting generality, in this case a simple linear topology as in FIG. 1 (not shown now) is assumed. The above-described, temporally fixed isochronous data communication takes place in the isochronous segment $t_{zykl}$ of a transmission cycle Z(m).

Figure 3:
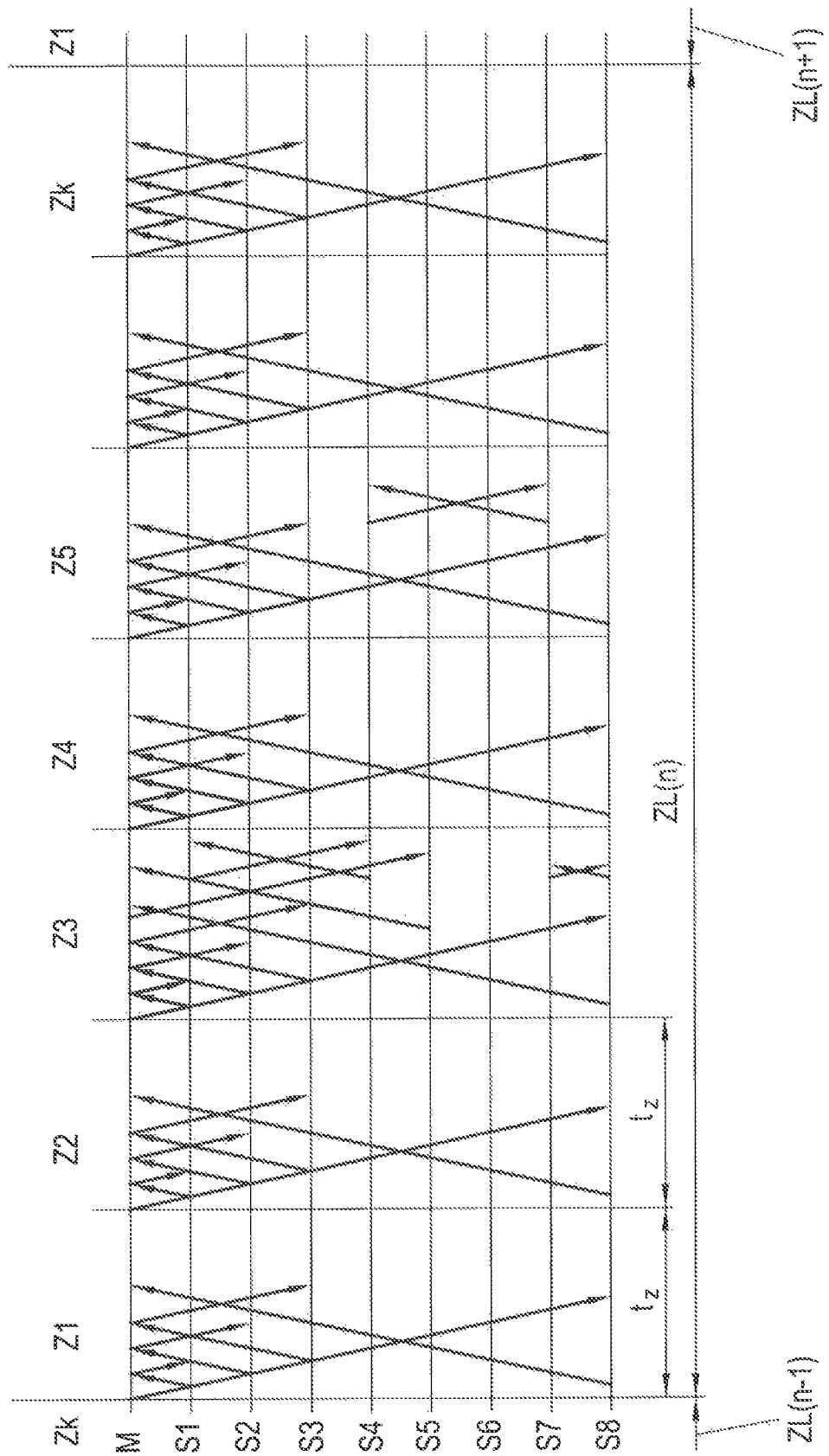
FIG. 3 depicts a first implementation of the inventive isochronous data communication.
Figure 4:
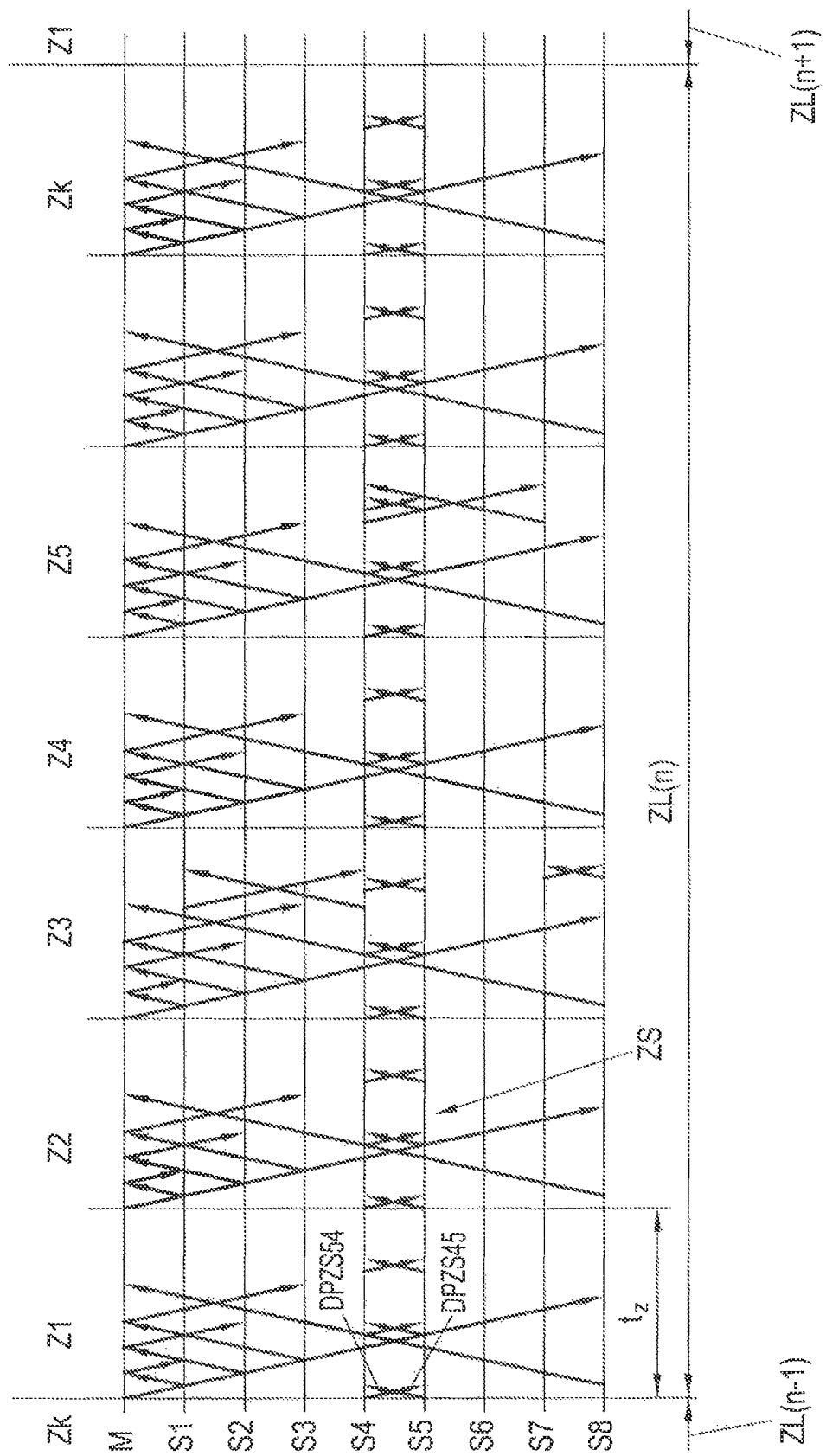
FIG. 4 depicts a second implementation of the inventive isochronous data communication; and, FIG. 5 depicts the synchronization of a plurality of slaves via rapid transmission cycles.

In order to provide slower network nodes, the opportunities to communicate in longer transmission cycles, in the embodiment according to FIG. 3 it is provided that a plurality of successive transmission cycles Z are combined into a slow transmission cycle ZL. In the example shown, k (k=7 here) successive transmission cycles Z1, . . . , Zk are combined into a slow transmission cycle ZL(n). This slow transmission cycle ZL including the transmission cycles Z1, . . . , Zk repeats itself continuously. This means that the transmit pattern for the data packets DP, determined by the individual transmission cycles Z1, . . . , Zk, repeats in each slow transmission cycle ZL(n). Thus certain network nodes, such as for instance the master M and the slaves S1, S2, S3, S8 can communicate with one another on the Ethernet data network 1 by the transmission cycle Z. The master M and the slave S5, as well as the slaves S1, S4 and S7, S8 and S4, S7 communicate with the slower slow transmission cycle ZL. This means that these network nodes only exchange data in every slow transmission cycle ZL(n). The transmission cycle Z3 of the specific slow transmission cycle ZL is provided for the slower data communication between master M and slave S5, as well between the slaves S1, S4 and S7, S8. The transmission cycle Z5 of the specific slow transmission cycle ZL is provided for the slower data communication between the slaves S4, S7. The transmit pattern of the slow transmission cycle ZL, that is, the times at which data packets are transmitted or received, repeats itself in each slow transmission cycle ZL. In the described exemplary embodiment, data communication takes place between master M and slave S5, as well as between the slaves S1, S4 and the slaves S7, S8, always in the third transmission cycle Z3 of each slow transmission cycle ZL. The slaves S4, S7 always communicate in the fifth transmission cycle Z5 of the slow transmission cycle ZL. Of course communication does not always have to be in both directions. A slave S could also only transmit to the master M or vice versa. Likewise, a network node could also transmit data packets multiple times in the slow transmission cycle ZL, that is, in different transmission cycles Z1, . . . , Zk.

It should be noted that the transmit pattern of each transmission cycle Z also repeats itself, i.e. data packets are transmitted or received in each transmission cycle Z at the same times, except for the data packets associated with the slow transmission cycle ZL(n).

It is especially also possible for certain network nodes, such as e.g. the master M, to send data packets both in the transmission cycle Z and also in the slower slow transmission cycle ZL. A network node, such as e.g. the slave S4, may also communicate with a plurality of other network nodes, such as e.g. the slaves S1, S7, in the slow transmission cycle ZL.

The free isochronous bandwidth in the transmission cycles Z may be used for the slower data communication in the slow transmission cycle ZL. In the planning for the data communication (or for the transmit times $t_M$, $t_S$ of the isochronous data packets), the slower data packets DPL maybe planned into free transmit slots of the isochronous data traffic of the transmission cycles Z. In this case care must simply be taken that there are no data collisions in the data network. One advantageous embodiment is embodied such that the data packets the data packets in the slow cycle ZL(n) are scheduled temporally as close as possible to the data packets in the transmission cycles Z1, . . . , Zk, so that the remaining asynchronous time remains as broad as possible. This facilitates planning and fully utilizing the asynchronous data traffic following the isochronous data traffic.

However, in the in the Ethernet data network 1 there may also be network nodes that want to exchange data with a faster rapid transmission cycle ZS via the Ethernet data network 1. In order not to also force this fast rapid transmission cycle ZS to the other network nodes, it may inventively also be provided that certain network nodes communicate with a rapid transmission cycle ZS that is shorter than the cycle time $t_{zykl}$ of a transmission cycle Z, as depicted in FIG. 4. In the exemplary embodiment according to FIG. 4, each transmission cycle Z is divided into j (here j=3) rapid transmission cycles ZS. This means that network nodes may exchange data with one another j times within a transmission cycle Z. For instance, in FIG. 4 data communication is provided between the slaves S4, S5 following the faster rapid transmission cycle ZS. This means that the slaves S4, S5 communicate with one another j times within a transmission cycle Z in that these exchange data packets DPZS45, DPZS54.

This may, but does not have to include, sending data packets DPZS45, DPZS54 in both directions. According to the systematics of the inventive data communication, the rapid transmission cycle ZS also repeats itself in each transmission cycle Z and thus also in each slow transmission cycle ZL(n). In this case, as well, it is possible for a network node to send data packets multiple times in the rapid transmission cycle ZS, even to other different network nodes.

The rapid transmission cycle ZS is in particular of interest for cross-traffic between two network nodes that are adjacent to or in the vicinity of one another in the Ethernet data network 1 in order to exchange direct data without going through the master M.

However, the rapid transmission cycle ZS is not limited to cross traffic, but instead data communication may also take place between master M and slave S after the rapid transmission cycle ZS. Likewise, the network nodes subscribing to direct cross-traffic do not have to be network nodes that are immediately adjacent in the data network 1.

Thus in practice three time planes are obtained in which isochronous data communication is may take place. A fast time plane in the form of a rapid transmission cycle ZS, a normal time plane in the form of a transmission cycle Z, and a slow time plane in the form of a slow transmission cycle ZL.

Thus, with the slow transmission cycle ZL and/or with the rapid transmission cycle ZS it is possible for the normal realtime-capable data communication to occur on the Ethernet data network 1 in a fixed transmission cycle Z, wherein correspondingly slower and/or faster data communication is also possible for slower and/or faster network nodes. In this manner the available isochronous bandwidth of the Ethernet network protocol may be fully utilized in a flexible and optimal manner. Realtime data communication may therefore be flexibly adapted to the specific application and/or to the specific network topology. Data communication may be planned precisely in advance with known network topology in order to prevent data collisions on the Ethernet data network 1.

A network node may also transmit a plurality of data packets to a specific recipient in each time plane (slow transmission cycle ZL, transmission cycle Z, rapid transmission cycle ZS) if e.g. there are more than 1500 bytes of data to transmit. A network node may also transmit different data every time in the rapid transmission cycle ZS or in the slow transmission cycle ZL. The slow transmission cycle ZL(n) has the greatest periodic time and the transmit pattern for the planned isochronous data packets repeats itself in each slow transmission cycle ZL(n).

Figure 5:
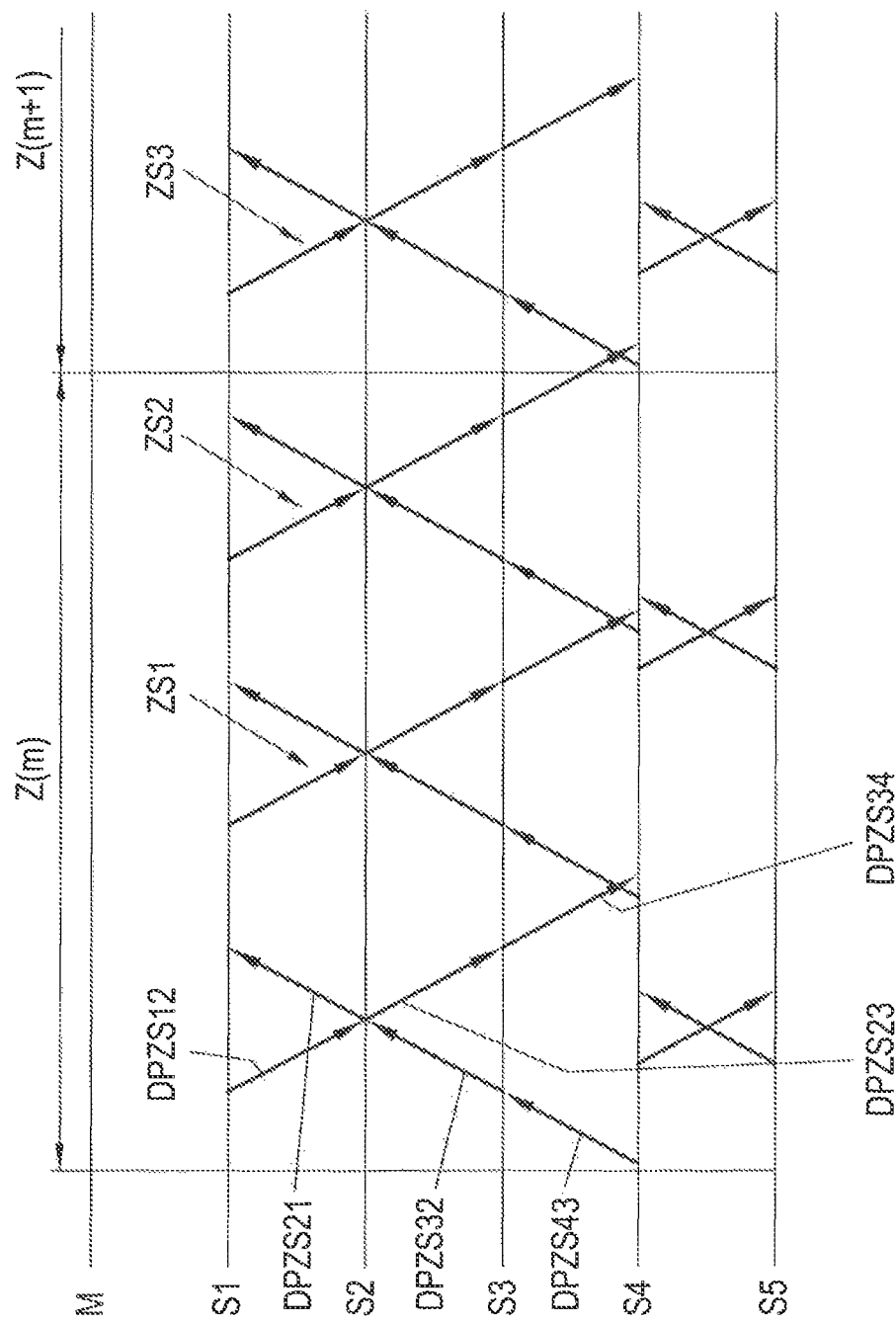

A rapid transmission cycle ZS may also be advantageously employed in an application in which a plurality of network nodes connected in a line must each synchronize with their neighbors, that is, must exchange data. The rapid transmission cycles ZS for the data communication between the specific network nodes can be planned in such that data packets from an adjacent network node are received at a certain time and time data packets are simultaneously transmitted to the other adjacent network nodes as depicted in FIG. 5. "Simultaneously" means, ideally, that a first slave transmits a data packet DP to the next slave at a time, as if one data packet were simply being conveyed through this first slave. In this exemplary embodiment it is provided that the slaves S1, S2, S3, S4 synchronize among one another. Data communication in the transmission cycle Z(m) and in the slow transmission cycle ZL is not shown in FIG. 5 for the sake of clarity. In the exemplary embodiment depicted, a transmission cycle ZS1, ZS2, ZS3 is provided between adjacent network nodes in the form of slaves S1, S2, S3, S4, wherein the rapid transmission cycle ZS1 is provided for data communication between the slaves S1 and S2, the rapid transmission cycle ZS2 is provided for data communication between the slaves S2 and S3, and the rapid transmission cycle ZS3 is provided for data communication between the slaves S3 and S4. The rapid transmission cycles ZS1, ZS2, ZS3 are preferably temporally offset to one another such that a slave S receives and transmits a data packet simultaneously. For instance, the slave S2 obtains a data packet DPZS12 from slave S1 and simultaneously transmits a data packet DPZS23 to the slave S3. In this way many adjacent network nodes may synchronize among one another in a transmission cycle Z(m) without significantly disturbing the conventional data communication in the transmission cycle Z(m). This simultaneous transmitting of data packets of course also may, but does not have to be provided, for the reverse transmit direction (that is from a slave to the master), as is depicted in FIG. 5 with the data packets DPZS43, DPZS32, DPZS21.

The cycle time $t_Z$ of a transmission cycle Z and the number k of transmission cycles Z1, . . . , Zk of a slow transmission cycle ZL are network parameters, i.e. are the same in the entire data network 1. Data communication of a network node may be planned such that it occurs in each transmission cycle Z (normal transmission cycle) and/or in a or a plurality of the k transmission cycles Z1, . . . , Zk (in the course of the slow transmission cycle ZL). The rapid transmission cycle ZS may be planned individually for each network node. That is, for instance, the number j between two slaves (e.g. j=3 of the slaves S1, S2 in FIG. 5) different from a number j between a slave and a master or between other slaves (such as e.g. j−2 of the slaves S4, S5 in FIG. 5). In a typical realtime-capable Ethernet data network 1 the number k may be a whole number in the range of 1 to 256, for instance, and the number j may be a whole number in the range of 1 to 64, for instance.

The periodic time of the transmission cycle Z or of the slow transmission cycle ZL is preferably used for reference time of the three time planes (slow transmission cycle ZL, transmission cycle Z, rapid transmission cycle ZS). This means that the cycle time $t_Z$ of a transmission cycle Z results corresponding to the reference time.

Naturally it is also possible to realize only two of the time planes in a data network 1, wherein a time plane is the transmission cycle Z.

The invention claimed is:

1. A method for isochronous data communication in a switched, realtime-capable Ethernet data network with network nodes which better utilizes available isochronous data bandwidth so as to prevent data collisions in said Ethernet data network, said Ethernet data network comprising a master and slave devices connected to one another via a switched Ethernet data network that provides for Ethernet data communication between the network nodes during a transmission cycle having a prespecified cycle time, the method comprising:
dividing the transmission cycle into plural rapid transmission cycles where two network nodes in said Ethernet data network communicate and exchange data with one another plural times in the rapid transmission cycle, wherein data communication of the two network nodes is provided in each of the plural rapid transmission cycles,
wherein the isochronous data communication between the master and the slave devices in said Ethernet data network is planned data communication that occurs cyclically, said planned data communication being predefined times known in advance,
wherein the two network nodes only exchange data during the rapid transmission cycle without going through the master, and
wherein the method better utilizes available isochronous data bandwidth so as to prevent data collisions in said Ethernet data network.

2. A method for isochronous data communication in a switched, realtime-capable Ethernet data network with plural network nodes which better utilizes available isochronous data bandwidth so as to prevent data collisions in said Ethernet data network, said Ethernet data network comprising a master and slave devices connected to one another via a switched Ethernet data network that provides for Ethernet data communication between said plural network nodes during a transmission cycle having a prespecified cycle time, the method comprising:
dividing the transmission cycle into plural rapid transmission cycles wherein the plural rapid transmission cycles comprise:
a first rapid transmission cycle implemented between first and second network nodes devices of the plural network nodes in said Ethernet data network; and
a second rapid transmission cycle implemented between the second network node and a third network node of the plural network nodes in said Ethernet data network,
wherein the first rapid transmission cycle and the second rapid transmission cycle are temporally offset to one another such that the second network node receives a first data packet from the first network node and simultaneously transmits a second data packet to the third network node,
wherein the isochronous data communication between the master and the slave devices in said Ethernet data network is planned data communication that occurs cyclically, said planned data communication being predefined times known in advance,
wherein communication occurs during the first and second rapid transmission cycles without significantly disturbing a transmission cycle that is neither a slow transmission cycle nor a rapid transmission cycle, and
wherein the method better utilizes available isochronous data bandwidth so as to prevent data collisions in said Ethernet data network.

3. A method for isochronous data communication in a switched, realtime-capable Ethernet data network with network nodes which better utilizes available isochronous data bandwidth so as to prevent data collisions in said Ethernet data network, said Ethernet data network comprising a master and slave devices connected to one another via a switched Ethernet data network that provides for Ethernet data communication between the network nodes during a transmission cycle having a prespecified cycle time, the method comprising:
combining a number of successive transmission cycles to create a slow transmission cycle where two network nodes in said Ethernet data network communicate with one another in the slow transmission cycle, wherein data communication of the two network nodes is provided in a given transmission cycle of each slow transmission cycle,
wherein the isochronous data communication between the master and the slave devices in said Ethernet data network is planned data communication that occurs cyclically, said planned data communication being predefined times known in advance and within the given transmission cycle,
wherein the two network nodes only exchange data during the slow transmission cycle, and
wherein the method better utilizes available isochronous data bandwidth so as to prevent data collisions in said Ethernet data network.

* * * * *